(12) United States Patent
Abel et al.

(10) Patent No.: US 8,942,095 B2
(45) Date of Patent: Jan. 27, 2015

(54) IDENTIFICATION OF QOS CLASSIFICATION BASED ON PACKET ATTRIBUTES

(75) Inventors: Francois Abel, Rüschlikon (CH); Claude Basso, Nice (FR); Jean L. Calvignac, Raleigh, NC (US); Natarajan Vaidhyanathan, Carrboro, NC (US); Fabrice Jean Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/302,489

(22) Filed: Nov. 22, 2011

(65) Prior Publication Data

US 2012/0300630 A1    Nov. 29, 2012

(30) Foreign Application Priority Data

Dec. 16, 2010  (EP) .................................... 10306439

(51) Int. Cl.
*H04L 12/54* (2013.01)
*H04L 12/851* (2013.01)
*H04L 29/06* (2006.01)

(52) U.S. Cl.
CPC ............ *H04L 47/2441* (2013.01); *H04L 69/22* (2013.01)
USPC ........................................................ 370/235

(58) Field of Classification Search
CPC .................................................... H04L 47/2441
USPC .................................... 370/235, 395.42, 444
See application file for complete search history.

(56) References Cited

U.S. PATENT DOCUMENTS

| | | | |
|---|---|---|---|
| 7,227,842 B1 * | 6/2007 | Ji et al. .......................... | 370/235 |
| 7,602,783 B2 * | 10/2009 | Aimoto .......................... | 370/392 |
| 8,040,886 B2 * | 10/2011 | Marshall et al. ............... | 370/392 |
| 2007/0038750 A1 | 2/2007 | Jorgensen | |
| 2008/0019368 A1 | 1/2008 | Liu et al. | |
| 2012/0039332 A1 * | 2/2012 | Jackowski et al. ............. | 370/389 |

* cited by examiner

*Primary Examiner* — Ricky Ngo
*Assistant Examiner* — Ben H Liu
(74) *Attorney, Agent, or Firm* — Yudell Isidore PLLC; Matthew Baca (57) ABSTRACT

A method, a system, and a computer program product is disclosed for identifying a quality of service (QoS) classification of a packet in a network by a network processor. The method comprising: providing a table wherein a priority value with a maximum of N values is used as an index into the table to retrieve a QoS classification having a maximum of M values with M less than N; receiving a data packet in a stream of data packets; extracting at least two priority indicator values from the packet; converting the at least two priority indicator values into a priority value; utilizing the priority value as an index into the table; extracting the entry in the table corresponding to the priority value as the QoS classification of the packet; and utilizing the QoS classification for subsequent processing of the data packet.

20 Claims, 6 Drawing Sheets

IDENTIFICATION OF QOS CLASSIFICATION BASED ON PACKET ATTRIBUTES

CROSS-REFERENCE TO RELATED APPLICATIONS

This invention claims priority to the foreign application EP10306439.0 filed Dec. 16, 2010 in the European Patent office.

BACKGROUND

1. Field

The invention relates generally to a method for operating a network processor. In particular, the invention relates to a computer program product, method, and system for packet classification of incoming packets in multiple priority classes in a high-performance network processor, which is generally part of the final packet classification into multiple receive queues.

2. General Background

Traditionally, the classification of a packet is derived from 'Quality-of-Service' (QoS) parameters found in a header of the packet. This classification is typically done with a simple decoding of the QoS field found in one packet header, for example:

A Virtual Local Area Network (VLAN) bridge classifies packets according to the 3 'P bits' defined as User Priority in the VLAN Header.

A Multiprotocal Label Switching (MPLS) switch classifies packets according to the 3 'E bits' initially defined as Experimental bits and currently transporting the QoS value of the packet.

An IP router classifies packets according to the 'DSCP byte' defined as the Differentiated Services in the IPv4 or IPv6 Header.

SUMMARY

A method, a system, and a computer program product are disclosed for identifying a Quality of Service (QoS) classification of a packet in a network by a network processor. The method comprising: providing a table wherein a priority value with a maximum of N values is used as an index into the table to retrieve a QoS classification having a maximum of M values with M less than N. The method further comprising: receiving a data packet in a stream of data packets; extracting at least two priority indicator values from the packet; converting the at least two priority indicator values into a priority value; utilizing the priority value as an index into the table; extracting the entry in the table corresponding to the priority value as the QoS classification of the packet; and utilizing the QoS classification for subsequent processing of the data packet.

DRAWINGS

The above-mentioned features of the present invention may be better understood, and its numerous objects, features, and advantages made apparent to those skilled in the art by taken in conjunction with the accompanying drawings wherein like reference numerals denote like elements and in which embodiments of the invention are described, by way of example only, and with reference to the following drawings.

DETAILED DESCRIPTION

Embodiments of the invention are described below with reference to drawings in detail.

By distilling a concise priority value from the diverse relevant values scattered throughout an IP packet, combining information from different layers and taking into account the service scenario (VLAN, MPLS, etc.), it is ensured that a quality classification takes into account all relevant data in the packet.

Further advantages of the present invention will become clear to the skilled person upon examination of the drawings and detailed description. It is intended that any additional advantages be incorporated herein.

Network communications data packets often conform to a layered communications protocol, comprising priority indicator values located in at least two parts of said packet corresponding to different communication layers respectively. With the advent of integrated high-speed network processors, a new requirement is identified with respect to priority classification which should now be capable of supporting any mix of priority indicator values found in different packet headers, because such network processors are likely to be used in equipments processing packets at multiple network layers, e.g. VLAN for Layer 2, MPLS for Layer 2.5, IP for Layer 3.

Considering this example in more detail, each of the protocols mentioned (VLAN, MPLS, IPv4 or IPv6) defines priority indicator values pertinent to priority or quality at its respective level, and it may be desirable to access several or all of these different values to determine a priority or quality classification requirements of the packet as a whole, or any component thereof.

FIG. 1 shows details of different exemplary priority indicator values.

Figure 1A:
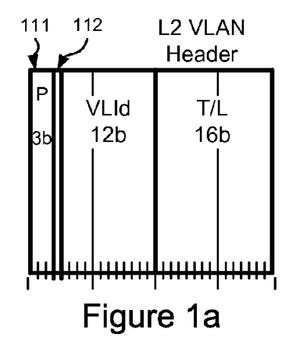
FIG. 1 shows details of different exemplary priority indicator values.

As shown in FIG. 1a, the VLAN header comprises a three bit "User Priority" value P 111, situated before the Canonical Form indicator bit C 112.

Figure 1B:
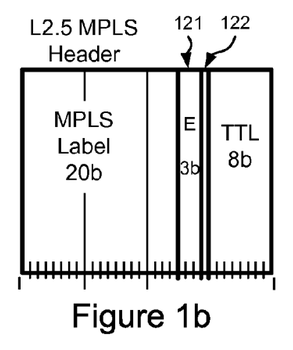

As shown in FIG. 1b, the MPLS header comprises a three bit "Experimental Use" value E 121, which by convention is used for QoS information, situated before the Bottom of Stack indicator bit S 122.

Figure 1C:
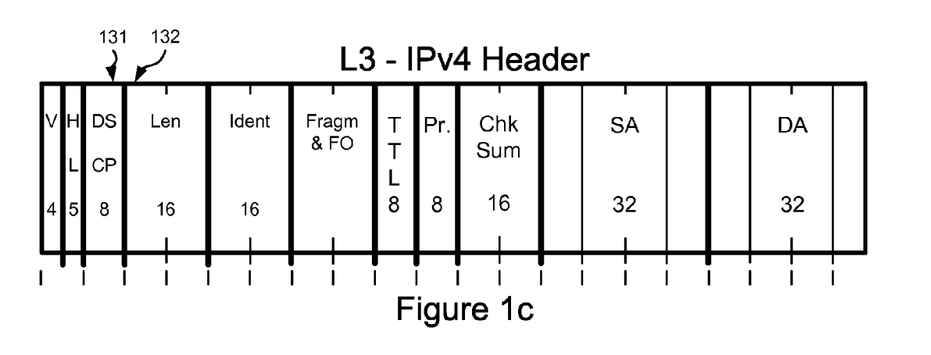

As shown in FIG. 1c, the IPv4 header comprises an eight bit "Differential Services Code Point" value DSCP 131, which is used for QoS information, situated before the "Len" value 132.

Figure 1D:
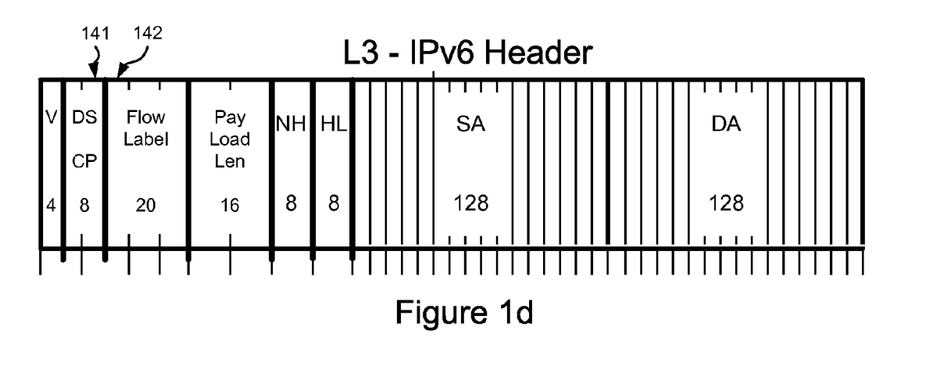

As shown in FIG. 1d, the IPv6 header comprises an eight bit "Differential Services Code Point" value DSCP 141, which is used for QoS information, situated before the "Flow Label" value 142.

Figure 2:
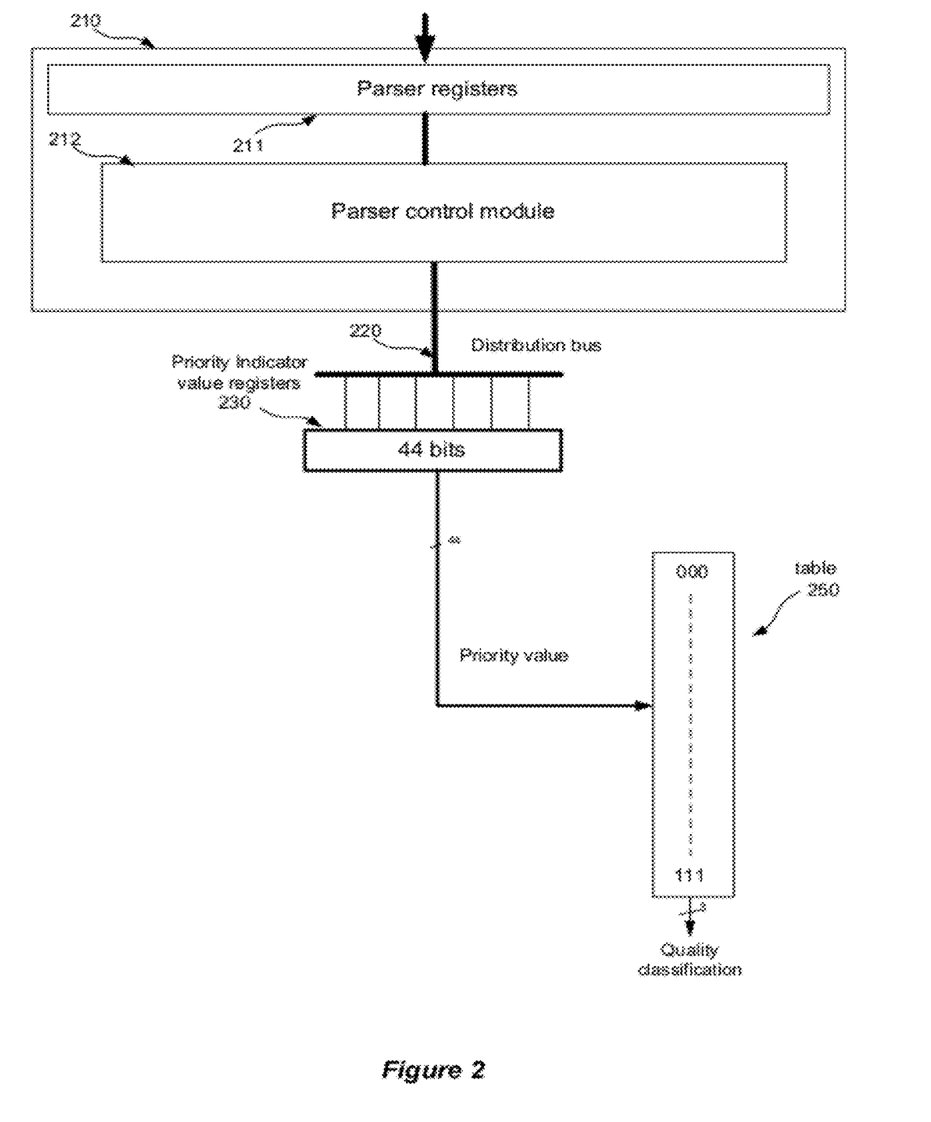
FIG. 2 shows a first embodiment.

FIG. 2 shows a first embodiment. As shown in FIG. 2, there is provided a Parser 210 comprising parser registers 211 and a parser control module 212. The Parser registers store one or more received packets or parts thereof, and generally contain at least the header of one packet. The Parser control is a programmable module controlling various functions of the parser, and in particular in the present embodiment is able to extract specific parts of the contents of the registers 211.

As shown, the Parser control module is able to address extracted data to Priority indicator value registers 230 via a distribution bus 220, which may also be used in routing data to other systems beyond the scope of the present invention.

Starting from the example of FIG. 1, on the basis that the most complicated header that might commonly be encountered might relate to a message having two consecutive MPLS labels requiring 3 bits each, and contain details for two consecutive VLANs requiring 3 bits each, as well as providing for two IP tunnels under either IPv4 (1 byte) or IPv6 (1 byte). This gives a total of (2×3)+(2×3)+(2×8)+(2×8)=44 bits. It will of course be appreciated that many other scenarios may also be considered, striking different compromises between the size of the registers 230, and the ability of the system to handle all possible header configurations.

As shown, the Priority indicator value register is 44 bits wide so as to accumulate the 44 bits identified above as constituting the different priority indicator values. These 44 bits can then be read out as a single 44 bit priority value, which is then applied as an index value to a table 250. This table comprises a quality classification entry for each possible priority value, in this case, having $2^{44}$ entries The Table is dimensioned such that each possible quality classification value can be stored in more than one entry, i.e., if the quality classification value is encoded on P bits, then the Table has more than $2^P$ entries. The flexibility of the solution comes from the way in which look-up is performed in the Table, more precisely in the way in which the look-up index is built. As shown, the quality classification is a three bit value, so that each of the $2^{44}$ possible input values is associated with one of $2^3=8$ possible quality classifications. Thus by means of the foregoing, any packet complying with the original assumptions concerning header structure scenarios can be reduced automatically to a three bit quality classification value taking into account all relevant data in the original packet.

Figure 3:
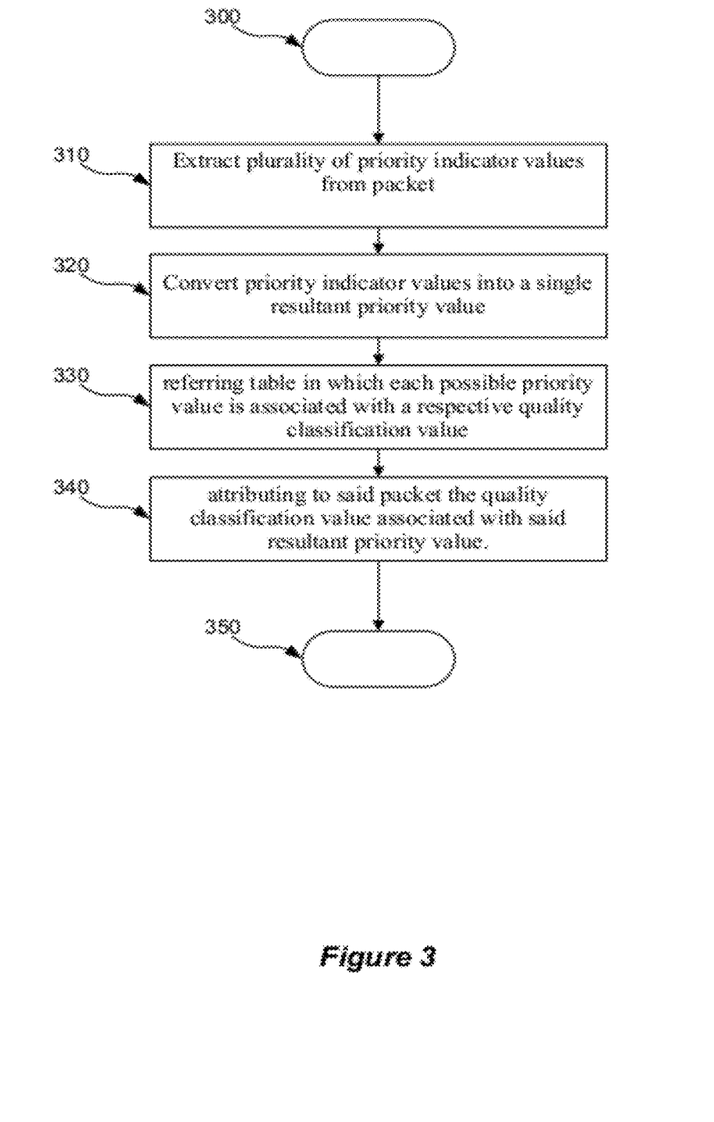
FIG. 3 shows a flowchart of the main steps of the first embodiment.

FIG. 3 shows a flowchart of the main steps of the first embodiment. The method starts at step 300 before proceeding to step 310 at which the various priority indicator values are extracted from the packet, e.g., by the parser control module 212 in communication with the parser registers 211. The method next proceeds to step 320 at which the various priority indicator values are converted into a single resultant priority value, e.g., by concatenating in the Priority indicator registers 230. The maximum number N of priority values is bound by 2 to the number of bits B representing the bits taken from the different fields. The method next proceeds to step 330 at which the table 250 in which each possible priority value is associated with a respective quality classification value is referred to. The number of classification values M has a fixed number of bits K required to represent the value or reserved for each entry. In an embodiment the table has K bits per entry with N entries. Finally the method proceeds to step 340 where a quality classification value associated with the resultant priority value is extracted from the table and the quality classification value is attributed to the packet, and the method then terminates at step 350.

In certain embodiments the capacities of the parser control module may be limited, for example in terms of the granularity with which it can extract parts of the contents of the registers. In particular, the parser control module may be able only to extract data from the parser registers in units of 8-, 16 or 32-bits. Where this is the case, the packet may be broken into a number of such units, and respective units containing said priority indicator values each extracted in their entirety. Where this is the case, the priority indicator value register needs to be structured to receive full bytes of data, which do not consist exclusively of quality or priority information.

Returning to FIG. 1 it can be seen that the P value 111 occupies the first 4 bits of a Byte. The E value occupies bits 5, 6 and 7 of a byte, the DSCP value occupies a whole single byte in IPv4, and the last four bits of one byte and the first four of the next in IPv6. On this basis, continuing with the header structure scenario of the first embodiment, it will be appreciated that 10 separate bytes must be extracted from the packet to obtain all relevant information.

Figure 4:
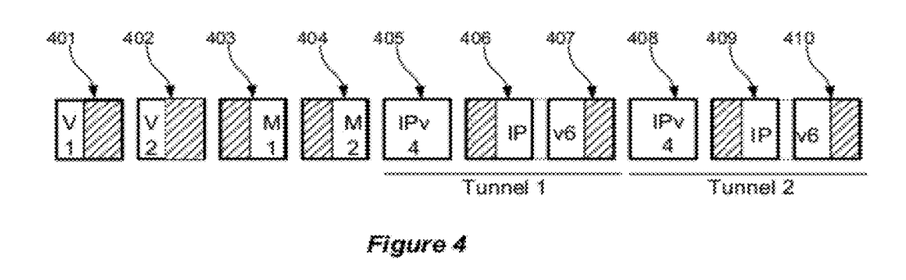
FIG. 4 shows the distribution of priority indicator values across extracted bytes.

FIG. 4 shows the distribution of priority indicator values across extracted bytes. As shown, 10 bytes are extracted. Byte 401 contains the P value of the first VLAN label in its first 4 bits. Byte 402 contains the P value of the second VLAN label in its first 4 bits. Byte 403 contains the E value of the first MPLS header in its 5th, 6th and 7th bits. Byte 404 contains the E value of the second MPLS header in its 5th, 6th and 7th bits. Byte 405 is entirely taken up by the IPv4 DSCP value in the first IP tunnel. Byte 406 contains the first half of the IPv6 DSCP value in the first IP tunnel in its last 4 bits, while Byte 407 contains the last half of the IPv6 DSCP value in the first IP tunnel in its first 4 bits. Byte 408 is entirely taken up by the IPv4 DSCP value in the second IP tunnel. Byte 409 contains the first half of the IPv6 DSCP value in the second IP tunnel in its last 4 bits. Byte 410 contains the last half of the IPv6 DSCP value in the second IP tunnel in its first 4 bits. The configuration imposed by the data fields of FIG. 4 can be generalized to define a structure for the Priority indicator value registers.

Figure 5:
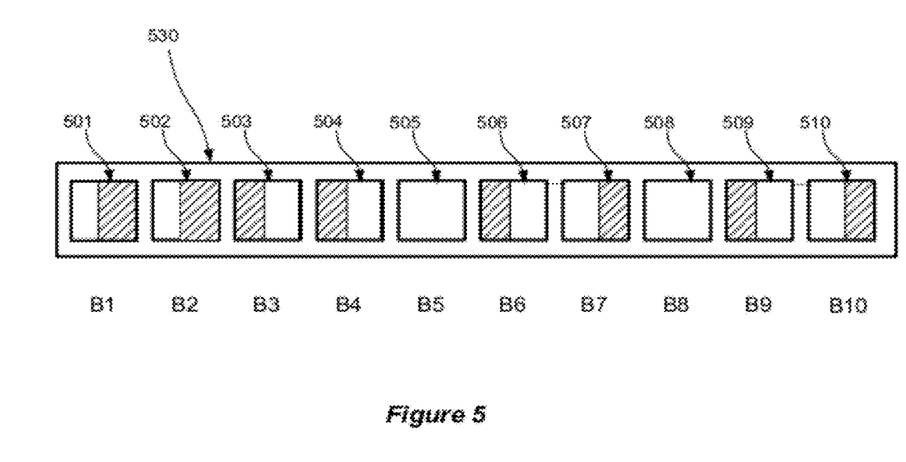
FIG. 5 shows a structure for the Priority indicator value registers according to a second embodiment.

FIG. 5 shows a structure for the Priority indicator value registers according to a second embodiment. As shown, the priority indicator value 530 according to this second embodiment comprises 10 registers 501 to 510, adapted to receive the ten Bytes 401-410 respectively extracted from the packet stored in the parser registers 211. Accordingly Priority indicator value registers 501 and 502 are configured to store the first 3 bits of the byte they receive, and discard the remainder. Registers 503 and 504 are configured to store the last 3 bits of the byte they receive, and discard the remainder. Registers 505 and 508 are configured to store the whole of the byte they receive. Registers 507 and 510 are configured to store the first 4 bits of the byte they receive, and discard the remainder. Registers 506 and 509 are configured to store the last 4 bits of the byte they receive, and discard the remainder. By this means, the parser control module 212 extracts data byte-wise from the parser registers 211, but at the output of the Priority indicator value registers 230 plurality of priority indicator values are converted into a\ priority value without extraneous content.

In certain cases, it may be that not all data relevant to priority and quality as written to the Priority indicator value registers 230 or 530 are required to obtain a satisfactory representation of the required quality classification. It will be appreciated that many variations to this approach are possible. In particular, the size of Registers 501 to 504 may advantageously be increased from 3 bits each to 4 bits each, bringing the total output priority value width to 48 bits, or 6 Bytes. In other words, the Priority indicator value register 530 may receive QoS parameters from the parser in a set of 10 input registers whose size is optimized according to the type of QoS parameters:

4-bit registers for small left-aligned QoS parameters, found for example in VLAN Headers IPv6 Headers (LS part of DSCP byte)

4-bit registers for small right-aligned QoS parameters, found for example in MPLS Headers IPv6 Headers (MS part of DSCP byte)

8-bit registers for large QoS parameters, found for example in IPv4 Headers

The assignment of these registers is flexible, i.e., determined only by the pico-code of the parser. The typical assignment accommodates:

2 VLAN Headers (two 4-bit registers left-aligned), to support VLAN-in-VLAN (aka QinQ) functionality 2 MPLS Headers (two 4-bit registers right-aligned), to support 2-level stacked MPLS protocol 2 IPv4 Headers (two 8-bit registers), to support IPv4 Tunneling 2 IPv6 Headers (two 4-bit registers right-aligned plus two 4-bit registers left-aligned), to support IPv6 Tunneling This has the advantage not only of conforming to an integral number of bytes, but also of providing extra flexibility in terms of the type of data that may be stored in each register. For example, two such half byte registers may be used to store an 8 bit DSCP value. The disadvantage is that this may lead to the priority value containing extraneous content, i.e., in the case of data in the form presented in FIG. 4, of four bits of data not relevant to quality or priority. It will be seen however that the Priority value aggregator and selection pattern table as described hereafter with respect to the third and fourth embodiments would provide the means to disregard such extraneous content.

Accordingly, the priority indicator values may be extracted from the packet byte wise. Furthermore, there may be provided a further step of discarding bits from the extracted bytes not pertaining to priority information. Still further, this further step of discarding bits from said extracted bytes not pertaining to priority information comprises writing the extracted bytes to respective registers sized and configured so as to store only bits pertaining to priority information, taking advantage of the known structure of said packet.

Figure 6:
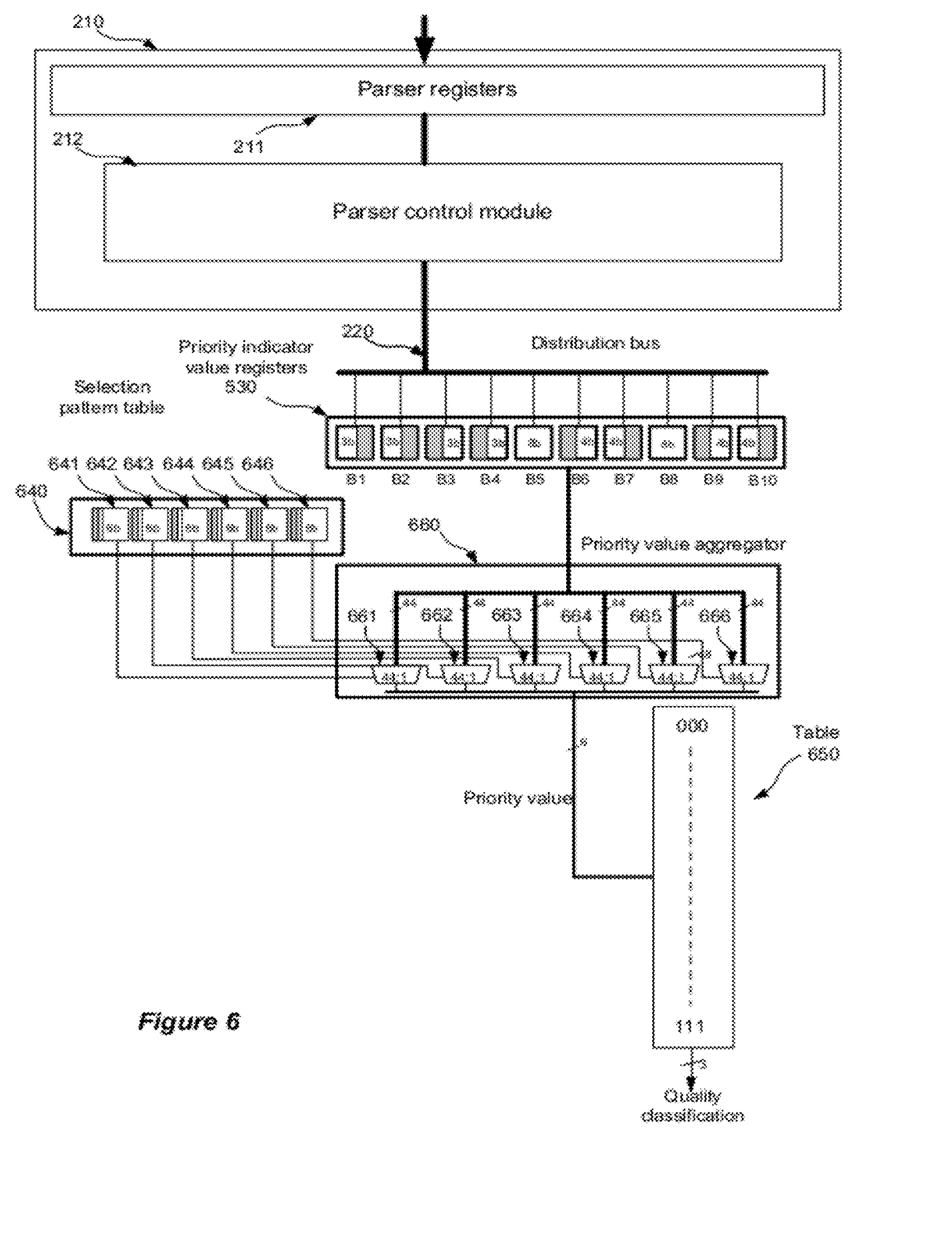
FIG. 6 shows a third embodiment providing for the selection of representative bits from the Priority indicator value registers.

FIG. 6 shows a third embodiment providing for the selection of representative bits from the Priority indicator value registers. As shown, there is provided a priority value aggregator 660, which contains six 44 to 1 multiplexers 661 to 666. Each of these six multiplexers is provided with all 44 of the bit values stored in the Priority indicator value registers 530, and on the basis of a control signal from a selection pattern table 640 selects one of the 44 input bit values for output on its respective output line, so that the priority value output from the Priority value aggregator is restricted to a total of six bits. These six bits are then fed to the Table 650 substantially as described with respect to the first embodiment so as to obtain a quality classification. As shown, selection pattern table 640 comprises six registers 641, 642, 643, 644, 645, 646, each containing a value identifying a respective one of the bit values stored in the Priority indicator value registers 530. Each selection pattern table register 641, 642, 643, 644, 645, 646 provides its identifying value to a respective Priority value aggregator 660 multiplexor 661, 662, 663, 664, 665, 666. Register 641 and multiplexor 661 are considered to correspond to the most significant bit of the Priority value Register 646 and multiplexor 666 are considered to correspond to the least significant bit of the priority value. In the present example each register 641, 642, 643, 644, 645, 646 contains a six bit value in order to specify any of the 44 bit values stored in the Priority indicator value registers 530.

Accordingly, the step 320 of converting in an embodiment comprises discarding certain bits of said plurality of priority indicator values, and concatenating the remaining bits. Furthermore, the discarded bits are defined by a selection pattern stored in a selection pattern table 640. Further still, the selection pattern table 640 comprise a plurality of said selection patterns corresponding to respective communications scenarios, whereby the selection pattern applied in discarding said bits is selected as corresponding to the current communications scenario.

By way of example three such scenarios are considered.

Example Scenario 1

IPv4

A common example of QoS enforcement for IPv4 packets is to rely on the 3 'Precedence' bits, i.e., the first three bits of the DSCP byte 131 in the IPv4 Header. Using the pattern of FIG. 4, these three bits are the 15th, 16th and 17th of the 44 bit values stored in the Priority indicator value registers 530. Accordingly, if the 44 Priority indicator value bit registers are numbered from 000000 to 101011, the selection pattern table 640 comprises the following selection pattern in Table 1 for this scenario.

TABLE 1

| Register | 641 (MSB) | 642 | 643 | 644 | 645 | 646 (LSB) |
|---|---|---|---|---|---|---|
| Value | 111111 | 111111 | 111111 | 010000 | 001111 | 001110 |
| Significance | Not used | Not used | Not used | DSCP P2 | DSCP P1 | DSCP P0 |

This scheme therefore selects the 3 bits P2, P1, P0 of the TOS (DSCP) byte in the IPv4 Header and uses them as the 3 Least Significant bits of the QoS index. The 3 Most Significant bits of the QoS index are unused and the table 650 maps the $2^3=8$ possible precedence values onto the $2^3=8$ available quality classifications.

Example Scenario 1

IPv6

A common example of QoS enforcement for IPv6 packets is to rely on the 6 'DSCP' bits of the DiffServ byte in the IPv6 Header. This scheme is implemented by selecting the 6 bits DS5 to DS0, that is the first six bits of the of the DiffServ field in the IPv6 Header and use the of the QoS index, and the table maps the 64 DiffServ Code Points values onto 8 priority values. Using the pattern of FIG. 4, these six bits are the 23rd to the 28th of the 44 bit values stored in the Priority indicator value registers 530. Accordingly, the selection pattern table 640 comprises the following selection pattern in Table 2 for this scenario.

TABLE 2

| Register | 641 (MSB) | 642 | 643 | 644 | 645 | 646 (LSB) |
|---|---|---|---|---|---|---|
| Value | 011011 | 011010 | 011001 | 011000 | 010111 | 010110 |
| Significance | DSCP DS5 | DSCP DS4 | DSCP DS3 | DSCP DS2 | DSCP DS1 | DSCP DS0 |

Example Scenario 3

VLAN/IPv4

An example of mixed definition of QoS can be based on the P bits found in the VLAN Tag and the 3 'Precedence' bits of the TOS byte in the IPv4 Header. This scheme is implemented by selecting the 3 bits P2, P1, P0 of the TOS byte in the IPv4 Header, using them as the 3 Least Significant bits of the QoS index, and selecting the three priority bits 111, that is, the first three bits, of the VLAN Tag, and using them as the 3 Most Significant bits of the QoS index.

Using the pattern of FIG. 4, the three bits P2, P1, P0 of the TOS byte are the 15th, 16th and 17th of the 44 bit values stored in the Priority indicator value registers 530, and the three priority bits 111 of the VLAN Tag are the 1st, 2nd and 3rd of the 44 bit values stored in the Priority indicator value registers 530. Accordingly, the selection pattern table 640 comprises the following selection pattern as shown in Table 3 for this scenario:

TABLE 3

| Register | 641 (MSB) | 642 | 643 | 644 | 645 | 646 (LSB) |
|---|---|---|---|---|---|---|
| Value | 000010 | 000001 | 000000 | 010000 | 001111 | 001110 |
| Significance | VLAN P2 | VLAN P1 | VLAN P0 | DSCP P2 | DSCP P1 | DSCP P0 |

The common case is that the TOS Byte and the VLAN Tag carry the same QoS value, but this scheme makes it possible to handle exceptions where the VLAN QoS could override the IPv4 QoS. The table 650 would then map the 64 QoS values onto 8 quality classifications.

Although in the present embodiment the priority value is reduced from 44 to 6 bits, any greater or lesser degree of compaction is possible, and may be applied depending on design constraints and other considerations. In particular, the number of bit forming the priority value may be selected as being equal to the size of the largest of the different priority indicator values.

It is an advantage of this approach that by reducing the bit width of the priority value, the size of the table 650 can be reduced from $2^{44}$ to $2^6$ entries, leading to a reduction in the footprint of the device as a whole.

It is a further advantage of this approach that by providing selection patterns in the selection pattern table 640 adapted to different situations; it is possible to vary the composition of the priority value at any time without needing to change the behaviour of the Parser Control module, thereby increasing the flexibility of the device.

More particularly, the Priority value aggregator can function so as to determine, for each of the priority value bits, which of all the priority indicator value bits loaded by the parser is to be selected. This allows the application to consider which bits of which QoS parameters should be considered and which should be ignored. The sum of considered bits should not be larger than log 2(N) where N is the number of entries in the Table. Then, the Table must be configured with priority values corresponding to each of the possible mixes of QoS parameters.

Certain network devices compatible with the present invention may define a plurality of Logical Ports. In many cases, it may be appropriate to associate each such logical port with a particular type of traffic or activity, so that similar quality considerations apply to all traffic on that logical port.

Figure 7:
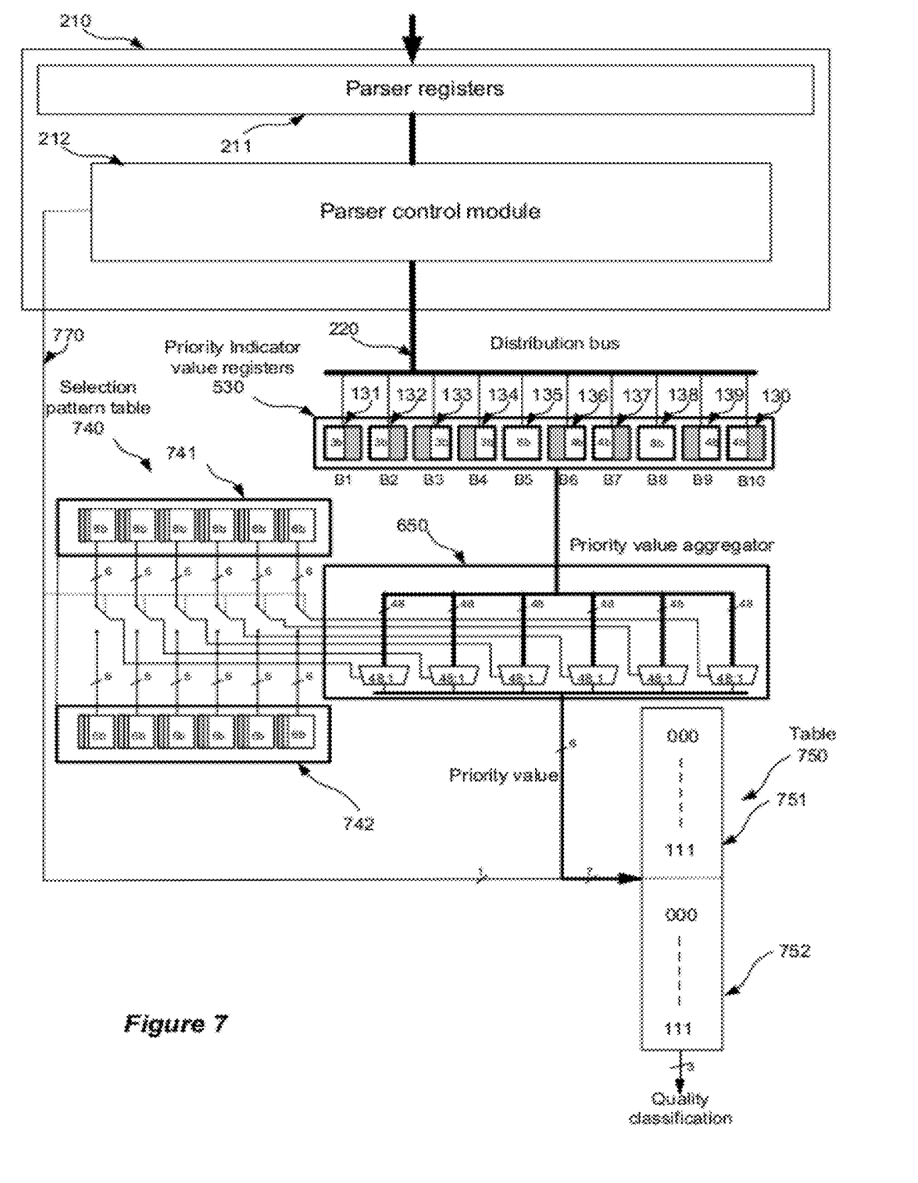
FIG. 7 shows a fourth embodiment, according to which the third embodiment is adapted to accommodate a plurality of logical ports.

FIG. 7 shows a fourth embodiment, according to which the third embodiment is adapted to accommodate a plurality of logical ports. As shown, the device supports two logical ports. The Table 750 is subdivided into a first sub-table 751 and a second sub-table 752. The two sub-tables 751 and 752 provide quality classification lookup for a first and second Logical Port respectively, and as such each comprises $2^6$ entries independently. Furthermore selection pattern table 740 comprises a first selection pattern 741 and a second selection pattern 742, for application to the values received by the Priority value aggregator 650 in the case of a Packet destined for the first logical port or the second logical port respectively. In other word the table 750 is divided into a plurality of sub-tables, each corresponding to a separate respective selection pattern stored in said selection pattern table 740. The Parser control module 212 is furthermore connected to the selection pattern table 750 by a selection pattern control line 770.

In accordance with the fourth embodiment, when the Parser Control module 212 determines that a particular packet relates to the first logical port, the selection pattern control line 770 is set to 0. This value causes the selection pattern table to output the first selection pattern 741 to the Priority value aggregator 650. The value on the pattern control line 770 is furthermore added to the priority value output from the Priority value aggregator as the most significant bit. The new seven bit priority value is fed to the Table 750 substantially as described with regard to preceding embodiments. The MSB value of 0 originating from the selection pattern control line 770 causes the remaining 6 bits to be applied to the first Sub-table 751, so that the quality classification lookup is performed in the proper context of the first logical port. Similarly, when the Parser Control module 212 determines that a particular packet relates to the second logical port, the selection pattern control line 770 is set to 1. This value causes the selection pattern table to output the second selection pattern 742 to the Priority value aggregator 650. The value on the pattern control line 770 is furthermore added to the priority value output from the Priority value aggregator as the most significant bit. The new seven bit priority value is fed to the Table 750 substantially as described with regard to preceding embodiments. The MSB value of 1 originating from the selection pattern control line 770 causes the remaining 6 bits to be applied to the second Sub-table 752, so that the quality classification lookup is performed in the proper context of the second logical port. In other words, a selection value selecting the selection pattern to be applied to a particular priority value is concatenated with said priority value as the most significant digits thereof, so that in applying said priority value to said table the corresponding sub-table of said table is accessed.

Thus there may be defined a plurality of logical ports, wherein each logical port handles communicates according to a respective communications scenario, and accordingly applies a respective said selection pattern.

It will be appreciated that any number of selection patterns may be provided in the selection pattern table, so as to allow for any number of logical ports. Furthermore, a plurality of selection patterns may be provided for each logical port, and the number of selection patterns may be different for some or all logical ports. Furthermore, the selection pattern table may provide selection patterns that are not specific to a particular logical port. For example, selection patterns may be provided for a case where it is not possible to map an incoming packet to any particular Logical Port, for example where the MAC address of the incoming packet is not associated with a particular logical port. Furthermore, a plurality of extra selection patterns may be provided for such exceptions corresponding to other characteristics of the received packet. For example, separate selection patterns may be provided for Multicast packets, Broadcast packets, and unicast packets respectively, or a subset of these.

Embodiments relate to a flexible selection of quality classification indicators in a table configured by software in line with the QoS classification requirements of the application. According to certain embodiments a multi layer network communications packet comprising nested headers according to successive network layers is parsed to extract values dispersed throughout the headers relating to priority or QoS requirements (priority indicator values) for the data at each respective layer. The gathered data (resultant priority value) are applied to a table mapping different possible resultant priority values to a lower resolution quality classification value. The priority indicator values or resultant priority value may be filtered, masked or compacted. According to certain embodiments, different subsets of the bits for the priority indicator values are selected on the basis of the logical port with which the packet is associated, and the final priority indicator value applied to a different sub-table providing quality classification value mapping adapted to that logical port.

It is understood that the registers 501-510 are not solely dedicated to VLAN, MPLS and IP protocols. Given that the parser control module is programmable, the invention provides the advantage to support other combinations of multilayer QoS classification, including new emerging protocols which are not (yet) standardized. Alternatively, an end-user has the possibility to refine a standard QoS classification policy based on its QoS rules (e.g., classify and further prioritize a specific traffic type based on a none-QoS field such as the layer-2 EtherType, the layer-3 Protocol Type or the layer-4 Port Type).

The invention can take the form of an entirely hardware embodiment, an entirely software embodiment or an embodiment containing both hardware and software elements. In a preferred embodiment, the invention is implemented in software, which includes but is not limited to firmware, resident software, microcode, parser pico-code etc. Furthermore, the invention can take the form of a computer program product accessible from a computer-usable or computer-readable medium providing program code for use by or in connection with a computer or any instruction execution system, For the purposes of this description, a computer-usable or computer readable medium can be any apparatus that can contain, store, communicate, propagate, or transport the program for use by or in connection with the instruction execution system, apparatus, or device. In particular, the parser control module as described above constitutes an instruction execution system or "computer" in this sense. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for identifying a quality of service (QoS) classification of a packet in a network processor, the method comprising:
   providing a table that may be indexed into by one or more priority values, each having a maximum of N values, to retrieve a QoS classification having a maximum of M values, wherein M is less than N;
   receiving a data packet in a stream of data packets, wherein the data packet comprises a plurality of priority indicator values;
   extracting at least two different priority indicator values of the plurality of priority indicator values from the data packet;
   converting the at least two different priority indicator values into a single resultant priority value by;
      applying a selection pattern to the at least two different priority indicator values to define a first set of bits of the at least two priority indicator values;
      discarding the first set of bits; and
      concatenating a remaining set of bits of the at least two different priority indicator values into the single resultant priority value;
   utilizing the single resultant priority value to index into the table;
   in response to utilizing the single resultant priority value to index into the table, extracting an entry from the table that corresponds to the single resultant priority value as a QoS classification of the data packet; and
   utilizing the QoS classification of the data packet for subsequent processing of the data packet.

2. The method of claim 1, wherein: the data packet conforms with a layered communications protocol, and wherein the at least two different priority indicator values are located in at least two different parts of the data packet corresponding to at least two different communication layers.

3. The method of claim 1, further comprising:
storing the data packet into at least two data units, wherein each data unit comprises a predetermined plurality of bits;
wherein the at least two different priority indicator values are each extracted from the data packet in their entirety.

4. The method of claim 1, further comprising:
defining a plurality of logical ports utilizing a plurality of sub-tables of the table, wherein each sub-table of the plurality of sub-tables provides a specific QoS classification corresponding to an associated logical port of the plurality of logical ports.

5. The method of claim 1, wherein the at least two priority indicator values are extracted from the data packet byte-wise, the method further comprising:
in response to extracting the at least two different priority indicator values from the data packet, discarding a first set of bits of the at least two different priority indicator values that does not pertain to any priority information.

6. The method of claim 1, wherein converting the at least two priority indicator values into the single resultant priority value further comprises:
in response to extracting the at least two different priority indicator values from the data packet: selecting the selection pattern from a plurality of selection patterns stored in a selection pattern table that corresponds to a communication scenario.

7. The method of claim 6, wherein the table is divided into a plurality of sub-tables, and wherein each sub-table corresponds to a different selection pattern stored within that sub-table.

8. A system for identifying a quality of service (QoS) classification of a packet in a network processor, the system comprising:
a network processor;
a table that may be indexed into by one or more priority values, each having a maximum of N values, to retrieve a QoS classification having a maximum of M values, wherein M less than N;
a receiving unit configured for receiving a stream of data packets; and
a program running on the network processor that is configured to:
extract at least two different priority indicator values of a plurality of priority indicator values from a data packet in the stream of data packets;
convert the at least two different priority indicator values into a single resultant priority value, by:
applying the selection pattern to the at least two different priority indicator values to define a first set of bits of the at least two priority indicator values;
discarding the first set of bits; and
in response to discarding the first set of bits of the at least two different priority indicator values, concatenating a remaining set of bits of the at least two different priority indicator values into the single resultant priority value;
utilize the single resultant priority value to index into the table;
in response to utilizing the single resultant priority value to index into the table, extract an entry from the table that corresponds to the single resultant priority value as the QoS classification of the data packet; and
utilize the QoS classification of the data packet for subsequent processing of the data packet.

9. The system of claim 8, wherein the data packet conforms with a layered communications protocol, and wherein the least two different priority indicator values are located in an at least two different parts of the data packet corresponding to at least two different communication layers.

10. The system of claim 8, wherein the data packet is stored into at least two data units each comprising a predetermined plurality of bits, and wherein the at least two priority different indicator values are each extracted in their entirety.

11. The system of claim 8, the program being further configured to:
defining a plurality of logical ports utilizing a plurality of sub-tables of the table, wherein each of the plurality of sub-tables provides a specific QoS classification corresponding to an associated logical port of the plurality of logical ports.

12. The system of claim 8, wherein the at least two priority indicator values are extracted from the data packet byte-wise, and wherein the program is further configured to:
in response to extracting the at least two different priority indicator values from the data packet, discard a first set of bits of the at least two different priority indicator values that does not pertain to any priority information.

13. The system of claim 8, wherein converting the at least two priority indicator values into the single resultant priority value further comprises:
in response to extracting the at least two different priority indicator values from the data packet:
select the selection pattern from a plurality of selection patterns stored in a selection pattern table that corresponds to a communication scenario.

14. The system of claim 13, wherein the table is divided into a plurality of sub-tables, and wherein each sub-table corresponds to a different selection pattern stored within that sub-table.

15. A computer program product for identifying a quality of service (QoS) classification of a packet in a network processor, the computer program product comprising a non-transitory computer readable storage medium having computer readable program code encoded therein that when executed performs a method comprising:
providing a table that may be indexed into by one or more priority values, each having a maximum of N values, to retrieve a QoS classification having a maximum of M values, wherein M less than N;
receiving a data packet in a stream of data packets, wherein the data packet comprises a plurality of priority indicator values;
extracting at least two different priority indicator values of the plurality of priority indicator values from the data packet;
converting the at least two different priority indicator values into a single resultant priority value by:
applying the selection pattern to the at least two different priority indicator values to define a first set of bits of the at least two priority indicator values;
discarding the first set of bits; and
in response to discarding the first set of bits of the at least two different priority indicator values, concatenating a remaining set of bits of the at least two different priority indicator values into the single resultant priority value;
utilizing the single resultant priority value to index into the table;
in response to utilizing the single resultant priority value to index into the table, extracting an entry from the table that corresponds to the single resultant priority value as a QoS classification of the data packet; and utilizing the QoS classification of the data packet for subsequent processing of the data packet.

16. The computer program product of claim 15, wherein the data packet conforms with a layered communications protocol, and wherein the least two different priority indicator values are located in at least two different parts of the data packet corresponding to at least two different communication layers.

17. The computer program product of claim 15, wherein the computer readable program code further comprises program code that when executed performs a method comprising:
   processing the data packet into at least two data units, wherein each data unit comprises a predetermines plurality of bits;
   wherein the at least two different priority indicator values are each extracted from the data packet in their entirety.

18. The computer program product of claim 15, wherein the computer readable program code further comprises program code that when executed performs a method comprising:
   defining a plurality of logical ports utilizing a plurality of sub-tables of the table, wherein each sub-table of the plurality of sub-tables provides a specific QoS classification corresponding to an associated logical port of the plurality of logical ports.

19. The computer program product of claim 15, wherein the at least two different priority indicator values are extracted from the data packet byte-wise, the method further comprising:
   in response to extracting the at least two different priority indicator values from the data packet, discarding a first set of bits of the at least two different priority indicator values that does not pertain to any priority information.

20. The computer program product of claim 15, wherein the computer readable program code further comprises program code that when executed performs a method comprising:
   in response to extracting the at least two different priority indicator values from the data packet:
      selecting a selection pattern of a plurality of selection patterns stored in a selection pattern table that corresponds to a communication scenario;
   wherein the table is divided into a plurality of sub-tables, and wherein each sub-table corresponds to a separate selection pattern stored in the selection pattern table.

* * * * *